UNITED STATES PATENT OFFICE.

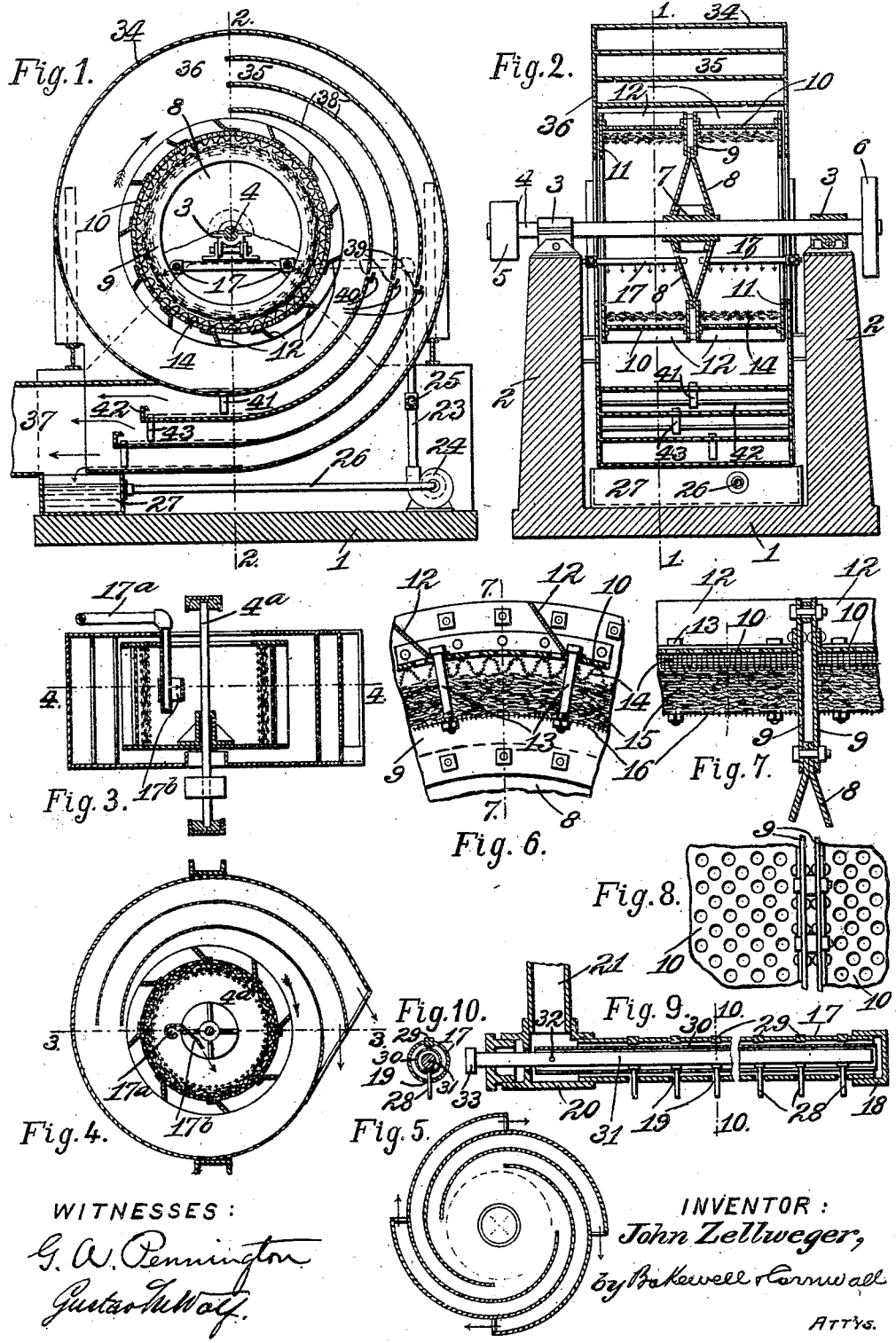

JOHN ZELLWEGER, OF ST. LOUIS, MISSOURI.

AIR FILTER AND COOLER.

No. 838,602.  Specification of Letters Patent.  Patented Dec. 18, 1906.

Application filed April 18, 1904. Serial No. 203,775.

*To all whom it may concern:*

Be it known that I, JOHN ZELLWEGER, a citizen of the United States, residing at St. Louis, Missouri, have invented a certain new and useful Improvement in Air Filters and Coolers, of which the following is a full, clear, and exact description, such as will enable others skilled in the art to which it appertains to make and use the same, reference being had to the accompanying drawings, forming part of this specification, in which—

Figure 1 is a vertical sectional view through my improved air filter and cooler on the line 1 1 of Fig. 2. Fig. 2 is a similar view taken at right angles or on the line 2 2 of Fig. 1. Fig. 3 is a vertical sectional view through a modified form of filter and cooler. Fig. 4 is a horizontal sectional view through the same on the line 4 4 of Fig. 3. Fig. 5 is a modified form of casing. Fig. 6 is an enlarged detail view of the filter-ring. Fig. 7 is a sectional view on the line 7 7 of Fig. 6. Fig. 8 is a plan view of a portion of the filter-ring. Fig. 9 is a sectional view through the water-supply pipe, and Fig. 10 is a sectional view through the same on the line 10 10 of Fig. 9.

This invention relates to a new and useful improvement in air filters and coolers, the object being to purify and cool air used for ventilating or other purposes.

Another object is to construct an air filter and cooler which is capable of depriving the air of dust and foreign particles, at the same time cooling the same and delivering it under pressure to the conduit-pipe, whence it is conducted to the room or rooms of the building.

In the accompanying drawings I have shown a very simple form of apparatus capable of carrying out my invention and which requires very little power to operate it in comparison with the capacity of the apparatus.

In order that some idea may be gained of the size of the apparatus shown in Figs. 1 and 2, I will now state that for a capacity of thirty-four thousand cubic feet of air per minute, the filter-ring running at a speed of two hundred revolutions per minute, the diameter of the casing will be about fourteen feet and the diameter of the air inlets or eyes about four feet six inches. Of course machines for different capacities will be built in different sizes and the speed of the filter-ring regulated according to the requirements of each case.

In the drawings, 1 indicates the foundation, which may be of suitable masonry having posts or other supports 2 at either side thereof, upon which are mounted the journal-boxes 3, said journal-boxes affording a bearing for a power-driven shaft 4, having a pulley 5 on one end and a pulley 6 on the opposite end, the latter pulley being belted to the pump. Mounted on this shaft is what I term the "filter-ring," which ring is preferably supported by a hub-sleeve 7, to which are secured disk plates 8, or in lieu of the imperforate disk plates shown spokes may be used. The outer edges of the disks 8 (see Fig. 7) carry ring-plates 9, to which are riveted or otherwise secured the flanges of circumferential plates 10, which plates are perforated for the passage of the air. The opposite or outer edges of plates 10 are preferably similarly flanged for the purpose of riveting or otherwise securing ring-plates 11 thereto, as shown in Fig. 2. Preferably angled wings or vanes 12 are secured to the plates 10 by means of bolts 13, which bolts extend inwardly and hold the filtering material in position. It should be understood, however, that these wings or vanes are not absolutely essential to the successful operation of my device, and, if desired, they could be dispensed with.

14 indicates corrugated wire mesh, which is arranged against the inner face of the plates 10 in such manner as to preferably provide open spaces in alinement with the perforations of the plates 10. Against the inner face of this corrugated wire mesh is placed a fibrous filtering material 15. I have found that excelsior makes a very cheap and good material for this purpose; but it is obvious that there are other materials, such as crushed coke, which may be used and which will answer equally well. In order to hold the excelsior or other filtering material in position, I arrange a facing-ring 16 against the inner face thereof, which facing-ring is preferably of wire mesh, and against which impinge the nuts on the bolts 13 for securing the same in position.

It will be observed that the plates 11 are of ring shape, and consequently are open at the center, so as to provide large eyes at each side of the filter-ring, the said filter-ring being supported at its middle, so as to permit the introduction of a supply of water onto the filtering material, either from the outside— as, for example, by the projection of a spray into the filter-ring and onto the filtering material—or the supply of water may be introduced through a pipe projecting into the filtering-ring and provided with perforations through which that water drops onto the filtering material, as shown in Fig. 2. I prefer the use of the pipe because by such means water can be introduced and evenly distributed over the filter-ring. There is a supply-pipe for each side of the filter-ring, said pipe being indicated by the numeral 17. The end of this pipe inside of the filtering-ring is closed by a cap 18 and said pipe is provided with discharge-openings 19 along its length, as shown in Fig. 9, said pipe being carried by a coupling 20, connecting it to a branch pipe 21, said branch pipe being supported in position by any appropriate means.

23 indicates a pipe leading to the branch pipe, which pipe is connected to a pump 24. Pipe 25 is a branch pipe leading from the riser on the pump to the branch pipe on the opposite side of the housing. The pump 24 has its suction-pipe 26 connected with a water-receptacle 27, which receptacle is employed for collecting the water which passes through the filtering-ring. The pipes 17 are preferably arranged so as to discharge the water at an angle at two places against the filtering-ring; but it is obvious that instead of two pipes one or more than two could be employed.

In order to keep the discharge-openings 19 free, I introduce loose pins 28 through openings in the opposite side of the pipe, which openings are subsequently closed by plugs 29. The pins 28 have heads on their inner ends, which heads rest upon the edges of a slot in an inner pipe 30. 31 indicates a rod which is preferably secured by a pin 32 in the outer end of the pipe 30, said rod passing through a packed joint to the exterior and provided with a head 33. In the event that the openings 19 become clogged or choked it is obvious that by moving the rod 31 the pipe 30 can be lifted or moved about within the pipe 17, and consequently motion is imparted to the several pins 28, which motion will clear the openings 19.

34 indicates the casing of the machine, which preferably starts from a point adjacent the periphery of the filter-cylinder and thence extends spirally around the cylinder to form a discharge-conduit 35. The ends of this spiral cylinder are closed by plates 36, which have openings preferably of corresponding diameter to the openings in the ring-plates 11, so as to form the eyes of the fan to admit air into the fan from both sides. The discharge-conduit 35 has its bottom wall terminating above the receptacle 27 and beyond this point continues as a conduit-pipe 37, as shown in Fig. 1.

The operation of my improved air filter and cooler is as follows: The filtering ring or cylinder is designed to be rotated in the direction of the arrow. (Shown in Fig. 1.) Water is introduced into the pipes so as to fill the receptacle 27, and the pump 24 is then preferably operated to draw the water from the receptacle 27 and force it through the supply-distributing pipes 17 onto the inner face of the filtering material. The filtering material thus becomes thoroughly saturated with water, which water is discharged outwardly by centrifugal force as the filtering-ring revolves against the inner face of the casing 34. The air entering through the eyes of the apparatus is also forced outwardly by centrifugal force through the filtering material and the perforated plates 10. As previously stated, I prefer to provide the filtering-ring with vanes or wings 12, as said wings facilitate the passage of the air through the filtering-ring. In actual operation, however, I have found that these wings may be omitted so that it should be understood that they are not essential to the successful operation of my device. The air which is introduced into the casing 34 under pressure will find its escape through the discharge-conduits 35 37. In passing through the filtering material the air, which is preferably drawn from the exterior, will be forced to find its way through the connected interstices of the filtering material and being thus finely divided more readily yields its impurities and foreign particles to the saturated filtering material. The water introduced onto the filtering material not only serves to flush said material and keep it comparatively clean, the foreign particles collected from the air being held in suspension and thrown off by centrifugal force; but, in addition to this, the air from the exterior will evaporate more or less water in the filtering mass and so doing yields a certain amount of heat, the air passing from the machine being relatively cooler than the air drawn into the machine.

By experiment I have found that with an outside temperature of 100° the air passing through the machine will not only be deprived of its impurities, but will have its temperature reduced about 20 degrees, depending upon its humidity. It is a known fact that air at a given temperature is capable of being saturated with moisture only to a certain extent. The lower the temperature the less will be the amount of moisture absorbed by the air. This being the case, it will be seen that by the use of my apparatus if the air entering the machine at 100° is comparatively dry—that is, not saturated with moisture—but is capable of being cooled by the evaporation and absorption of moisture, its temperature will be reduced, so that after leaving the machine such air at a reduced temperature is to an extent saturated with moisture, and when introduced into a room will, upon absorbing heat and cooling the room, have its capacity for absorption increased in proportion to the higher temperature which it reaches. Thus while in its cooler state the air from my machine may be moist when it reaches a higher temperature it is comparatively dry.

As the filtering-ring rotates and throws off the air and water by centrifugal force it is obvious that the particles of water leave the ring in tangential lines, and in order to collect the water which is thrown into the discharge-conduit 35 I arrange partition-plates 38 in said conduit, which partition-plates divide the conduit into compartments. In the length of these partition-plates as well as near the inner end of the continuation of the casing 34 I arrange slots 39, adjacent to which are gutters 40, forming transfer-points for the water. Thus any water dripping from the under surface onto the upper surface of the partition-plates or the casing will be received in the gutters and transferred onto the upper surface, so that said water will not again drip in the lower half of the machine from the under surface onto the upper receiving-surface therebeneath. In this way I prevent the air passing through the discharge-conduit from carrying the water in the form of a spray into and through the conduit 37. To transfer the water from the casing 34 without disturbance, I arrange a pipe 41 in the bottom of said casing and extend said pipe down close to the partition 38 immediately thereunder. The end wall of this partition 38 is provided with a flange 42 to trap a certain amount of water, and a pipe 43, arranged slightly above its bottom is arranged in this partition 38 and extends close to the bottom of the next partition 38 immediately therebeneath, which is provided with an end flange or wall and a discharge-pipe similar to the one above described, said last-mentioned discharge-pipe in the lowermost partition 38 leading off its water to the end wall of the casing 34, over which it drops into the receptacle 27. From the above it will be seen that the lower ends of these collecting-pipes are sealed by a pool of water underneath, which prevents the current of air from disturbing the water in its transfer from the casing or the partitions to the receptacle 27.

Referring now to the modification shown in Figs. 3 and 4, it will be seen that instead of using the horizontal shaft, as in the construction shown in Figs. 1 and 2, there is here shown a vertical shaft $4^a$, mounted in suitable bearings and carrying a filter ring or cylinder of substantially the same character as the one hereinbefore described, except that this cylinder has an eye on one side only. The spiral casing around the cylinder is substantially the same as that hereinbefore described, except that the water collected against the spiral walls thereof is received by the bottom wall, whence it may be pumped back into the water-supply pipe $17^a$. This supply-pipe instead of being perforated, as before described, is provided with a discharge-opening through which a jet of water is emitted, said jet being received against a deflecting-plate $17^b$ and sprayed against the inner face of the filtering material. In the construction shown in Figs. 3 and 4 the spiral conduit discharges at one point only. It is obvious that a series of spirally-arranged plates could be employed, as shown in Fig. 5, so as to multiply the points of discharge. It will be noticed with respect to these modifications, as well as with respect to the preferred construction, that the important feature of this invention resides in the filtering cylinder or ring carrying the filtering material, preferably of very coarse excelsior, between a cylinder of perforated metal on the outside and cylindrical sections of wire-cloth on the inside, with stay-bolts between them. This filter cylinder or ring is revolved with the shaft and kept wet with water sprinkled on it from within. The air in the spaces of the rotating filter cylinder or ring is carried along in a circular course and by the centrifugal force developed thereby is thrown out in the same manner as from the wheel of a centrifugal fan. More air follows by atmospheric pressure, and the result is a rapid air-current through the filter-ring and the forcible contact of the air passing with the water on the excelsior. All dirt and some gases are taken by the water from the air, while the air evaporates and absorbs some of the water. The heat necessary for this evaporation is taken from the air or from the water or from both if their temperature is above the temperature of saturation of the air used. Air and water leave the filter-ring at the same temperature, which is from 70° to 80° Fahrenheit for summer weather. The water is thrown from the filter-ring in numerous small drops, which are caught up and retained by the spiral casing. The drops and mist which are carried along by the rapidly-moving air enter the separator-duct, which conveys the air about half-way around and through the action of centrifugal force gradually approach and finally touch and adhere to the several partitions of the casing.

In the specification I have used the word "filter" to designate a bed of small bodies—such, for example, as wood-shavings, brush-wood, crushed charcoal or coke, wire-netting, &c.—kept wet by a liquid and with passages between them so large that air can flow through those passages freely and rapidly when it is under the influence of only a moderate force. In this machine such force is produced in the air itself by rotating the filter with its contained air at great speed around a shaft. The centrifugal force produced in the air by this rotation causes each particle of air to move outwardly through the filter-passages. A filtering of curled wood strips about one-eighth of an inch by one-sixteenth of an inch by three inches long rotating around a shaft with a velocity of three thousand feet per minute causes air to flow through its passages against an outer resistance equal to three-eighths of an inch water-pressure at a speed of six feet per minute. In this filter the purification of air is effected by making the foreign particles adhere to the water film on the surfaces of the small bodies constituting the filter and by immediately washing them out of the filter.

My improved filter acts as an air-propeller and as an air-purifier at the same time, and is therefore essentially different form a filter consisting of a fabric, cloth or one thickness of netting with meshes so small that it can purify air by obstructing the passage of the foreign particles and retain the same on its surface until they are removed periodically. Such a close-meshed filter requires considerable pressure of air either from a blower or from atmospheric pressure to effect a transit of air through it.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. An air filter and cooler comprising a filter-ring formed of porous material and adapted to be rotated at a high speed for drawing air into the interior thereof, and means for supplying water to the inner face of said ring whereby the air and water are forced outwardly by centrifugal force through the material of the filter-ring; substantially as described.

2. An air filter and cooler comprising a filter-ring formed of porous material and adapted to be rotated at a high speed for drawing air into the interior thereof, a casing surrounding said ring and provided with an opening communicating with the interior of the ring and affording a passage-way for the air which is drawn into the interior of the ring, and a water-conduit extending through the opening in the casing for supplying water to the inner face of the filter-ring, whereby air and water are forced outwardly by centrifugal force through the material of the ring into the casing which surrounds said ring; substantially as described.

3. In an air filter and cooler, the combination of a casing having an eye and a discharge-conduit, a centrifugal fan mounted in said casing and adapted to be rotated at a high speed, an internal filter-ring carried by the fan, and means for supplying water and air to the inner surface of said ring, whereby the air and the water are together forced outwardly; substantially as described.

4. In an air filter and cooler, the combination of a casing having an eye and a discharge-conduit, an open-ended perforated cylinder mounted in the casing and adapted to be rotated at a high speed, the open end of said cylinder registering with the eye of the casing, a corrugated wire mesh arranged against the inner face of said perforated cylinder, fibrous filtering material arranged against said corrugated wire mesh, a perforated facing-plate for said filtering material, stay-bolts, longitudinally-disposed air-projecting wings or vanes arranged on the outside of said cylinder and held in position by said stay-bolts and means for supplying air and water to the inner surface of said filtering material, whereby the air and the water are together forced outwardly in the chamber formed by the casing; substantially as described.

5. In an air filter and cooler, the combination of a filter-cylinder a water-supply therefor, a casing therefor having a curved discharge-duct, one or more slotted partitions in said discharge-duct, and gutters arranged adjacent said slots to transfer moisture from one side to the other of said partitions; substantially as described.

6. In an air filter and cooler, the combination of a high-speed filter-ring, means for supplying water to the inner surface thereof, a casing entirely surrounding said filter-ring so as to provide a continuous air-collecting chamber entirely around said filter-ring, and a curved air-discharge duct leading from one side of said casing and following the contour of the casing; substantially as described.

7. In an air filter and cooler, the combination of a high-speed filter-ring, means for supplying water to the inner surface thereof, a casing entirely surrounding said filter-ring so as to provide a continuous air-collecting chamber entirely around said filter-ring, a curved air-discharge duct leading from one side of said casing and following the contour of the casing, and longitudinally-disposed partitions in said discharge-duct, which partitions terminate at the inner end of said duct and do not extend into the air-chamber surrounding the filter-ring; substantially as described.

8. In an air filter and cooler, the combination of a high-speed filter-ring, a pump for supplying water to the inner surface thereof, a casing entirely surrounding said filter-ring and providing a continuous air-collecting chamber entirely around said filter-ring, a curved air-discharge duct leading from one side of said casing and following the contour of the casing, a receptacle for receiving the water thrown into the casing and discharge-duct, and a connection between said receptacle and said pump, and the pump and the interior of the ring, whereby the water from said receptacle is pumped back onto the inner surface of the filter-ring; substantially as described.

9. In an air filter and cooler, the combination with a filter-cylinder, of a pipe for distributing water over the inner face of said cylinder, said pipe having perforations, pins loosely arranged in said perforations, and means for moving said pins; substantially as described.

10. In an air filter and cooler, the combination with a filter-cylinder, of a pipe for distributing water over the inner face of said cylinder, said pipe having alining perforations forming discharge-openings, headed pins arranged in said perforations, a slotted pipe within the first-mentioned pipe for receiving the heads of said pins, and a rod arranged in the slotted pipe and coöperating with the heads of the pins, said rod extending to the exterior; substantially as described.

11. In an air filter and cooler, the combination of a filter-ring adapted to be rotated at a high speed, a series of longitudinally-disposed wings acting as centrifugal fan-blades on its periphery, and means for supplying water and air to the inner surface of said ring, whereby the air and the water are together forced outwardly by centrifugal force; substantially as described.

12. In an air filter and cooler, the combination of a filter-ring open at one end, and adapted to be rotated at a high speed, a series of longitudinally-disposed wings acting as centrifugal fan-blades on its periphery, a casing surrounding said ring forming a receiving-chamber for the air and water as they are forced outwardly by centrifugal force through the filter-ring, said casing having an eye through which the open end of said filter-ring is exposed, whereby external air is induced to flow into the filter-ring, and a conduit for supplying water to the inner face of said filter-ring; substantially as described.

13. An air filter and cooler comprising a cylindrical casing provided in one of its side walls with an opening, a porous filter-ring mounted in said casing and adapted to be rotated at a high speed to draw air into the interior thereof through the opening in the casing, a curved discharge air-duct communicating with the interior of the casing and following the contour of said casing, a conduit for supplying water to the inner face of the filter-ring whereby air and water are forced outwardly by centrifugal force through the porous material of the ring into said casing, a receptacle for receiving the water which drains down the walls of said casing and said discharge-duct, a pump for forcing water into the supply-conduit, and a conduit for carrying the water from said receptacle back to the pump; substantially as described.

In testimony whereof I hereunto affix my signature, in the presence of two witnesses, this 15th day of April, 1904.

JOHN ZELLWEGER.

Witnesses:
G. A. PENNINGTON,
GEORGE BAKEWELL.